(12) United States Patent
Zhang et al.

(10) Patent No.: US 9,039,370 B2
(45) Date of Patent: May 26, 2015

(54) TURBINE NOZZLE

(75) Inventors: Luzeng Zhang, San Diego, CA (US); Juan Yin, San Diego, CA (US); Hee Koo Moon, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 542 days.

(21) Appl. No.: 13/433,542

(22) Filed: Mar. 29, 2012

(65) Prior Publication Data

US 2013/0259703 A1    Oct. 3, 2013

(51) Int. Cl.
*F01D 5/08* (2006.01)
*F01D 5/18* (2006.01)
*F01D 5/20* (2006.01)
*F01D 9/04* (2006.01)

(52) U.S. Cl.
CPC ............... *F01D 5/186* (2013.01); *F01D 9/041* (2013.01); *F05D 2260/202* (2013.01)

(58) Field of Classification Search
CPC ....................................................... F01D 5/00
USPC .......................... 416/95, 96 R, 97 R; 415/115
See application file for complete search history.

(56) References Cited

U.S. PATENT DOCUMENTS

| | | | |
|---|---|---|---|
| 6,241,466 B1 | 6/2001 | Tung et al. | |
| 6,270,317 B1 | 8/2001 | Manning et al. | |
| 6,287,075 B1 | 9/2001 | Kercher | |
| 6,514,042 B2 * | 2/2003 | Kvasnak et al. | 416/97 R |
| 7,008,178 B2 * | 3/2006 | Busch et al. | 415/115 |
| 7,836,703 B2 * | 11/2010 | Lee et al. | 60/806 |
| 7,837,441 B2 | 11/2010 | Spangler et al. | |
| 7,854,591 B2 | 12/2010 | Liang | |
| 7,866,948 B1 | 1/2011 | Liang | |
| 7,878,761 B1 | 2/2011 | Liang | |
| 7,946,815 B2 | 5/2011 | Liang | |
| 7,967,567 B2 | 6/2011 | Liang | |
| 7,997,866 B2 | 8/2011 | Naik et al. | |
| 8,011,890 B2 | 9/2011 | Walters et al. | |
| 2003/0231955 A1 * | 12/2003 | Barry et al. | 415/115 |
| 2005/0244264 A1 | 11/2005 | Jacks et al. | |
| 2008/0056907 A1 | 3/2008 | Heyward et al. | |
| 2009/0067987 A1 | 3/2009 | Pellet et al. | |
| 2009/0155050 A1 | 6/2009 | Broomer et al. | |
| 2010/0008761 A1 | 1/2010 | Piggush et al. | |

* cited by examiner

*Primary Examiner* — Dwayne J White
*Assistant Examiner* — Brian P Wolcott
(74) *Attorney, Agent, or Firm* — Finnegan, Henderson, Farabow, Garrett & Dunner, LLP

(57) ABSTRACT

A nozzle arrangement for a gas turbine engine comprising a first housing member and a second housing member. The nozzle arrangement may further include a first nozzle and a second nozzle. Each of the first nozzle and second nozzle may extend between the first housing member and the second housing member so as to form a doublet. A plurality of cooling apertures may be arranged on at least one of the first nozzle, the second nozzle, the first housing member, or the second housing member so as to provide a different degree of first order cooling across the doublet.

13 Claims, 5 Drawing Sheets

TURBINE NOZZLE

TECHNICAL FIELD

The present disclosure relates generally to gas turbine engine (GTE) turbine nozzles, and more particularly, to devices for cooling GTE turbine nozzles.

BACKGROUND

GTEs produce power by extracting energy from a flow of hot gas produced by combustion of fuel in a stream of compressed air. In general, turbine engines have an upstream air compressor coupled to a downstream turbine with a combustion chamber ("combustor") in between. Energy is released when a mixture of compressed air and fuel is burned in the combustor. In a typical turbine engine, one or more fuel injectors direct a liquid or gaseous hydrocarbon fuel into the combustor for combustion. The resulting hot gases are directed over blades of the turbine to spin the turbine and produce mechanical power.

In high performance GTEs, a portion of the compressed air is used to cool GTE components, for example turbine components, exposed to hot gas flow. GTEs include cooling passages and cooling flows for receiving the portion of compressed air to improve reliability and cycle life of individual components within the GTE. GTE components, such as stationary turbine guide vanes, commonly referred to as turbine nozzles, are arranged such that the portion of compressed air flows through a plurality of internal cooling passages of the turbine nozzles.

U.S. Pat. No. 7,836,703 to Lee et al. (the '703 patent) describes a cooled turbine nozzle assembly. According to the '703 patent, the assembly may include an annular turbine nozzle 20 including alternating pairs of first and second stator vanes 36, 38 arranged in pairs in nozzle doublets. Each of the first and second stator vanes 36 and 38 includes a varying cooling circuit 63, 64 inserted within stator vanes 36 and 38, respectively, so as to affect cooling in conjunction with a circumferential "clocking" of individual fuel injectors to avoid hot streaks.

SUMMARY

Embodiments of the present disclosure may be directed to a nozzle arrangement for a gas turbine engine comprising a first housing member and a second housing member. The nozzle arrangement may further include a first nozzle and a second nozzle. Each of the first nozzle and second nozzle may extend between the first housing member and the second housing member so as to form a doublet. A plurality of cooling apertures may be arranged on at least one of the first nozzle, the second nozzle, the first housing member, or the second housing member so as to provide a different degree of first order cooling across the doublet.

In further embodiments, the present disclosure may include a nozzle arrangement comprising a first housing member and a second housing member. The nozzle arrangement may further include a first nozzle and a second nozzle. Each of the first nozzle and second nozzle may extend between the first housing member and the second housing member so as to form a doublet. A plurality of cooling apertures may be arranged on at least one of the first nozzle, the second nozzle, the first housing member or the second housing member. The arrangement of apertures may be asymmetric with respect to the first nozzle and the second nozzle.

In further embodiments, the present disclosure may be directed to a nozzle arrangement for a gas turbine engine comprising a first housing member and a second housing member. The nozzle arrangement may further include a first nozzle and a second nozzle. Each of the first nozzle and second nozzle may extend between the first housing member and the second housing member so as to form a doublet. Each of the first nozzle and second nozzle may include a concave surface and an oppositely arranged convex surface. A plurality of cooling apertures may be arranged on at least one of the first nozzle, the second nozzle, the first housing member or the second housing member. Additionally, the plurality of apertures may include a larger number of apertures on at least one of the first housing member or the second housing member between the concave surface of the second nozzle and the convex surface of the first nozzle than between a concave surface of the first nozzle and an adjacent end of the doublet.

DETAILED DESCRIPTION

GTE's include one or more stages of turbine rotary and stationary blades. Each stage of a turbine of a GTE may include an arrangement of upstream stationary turbine blades (i.e. turbine nozzles) and an arrangement of downstream rotary turbine blades. For example, the arrangement of turbine nozzles may include an annular ring, comprised of a plurality of nozzles in the shape of an airfoil, while the arrangement of turbine blades may include a plurality of blades in the shape of an airfoil and configured for rotational movement along a central rotary shaft (not shown) of the GTE.

Figure 1:
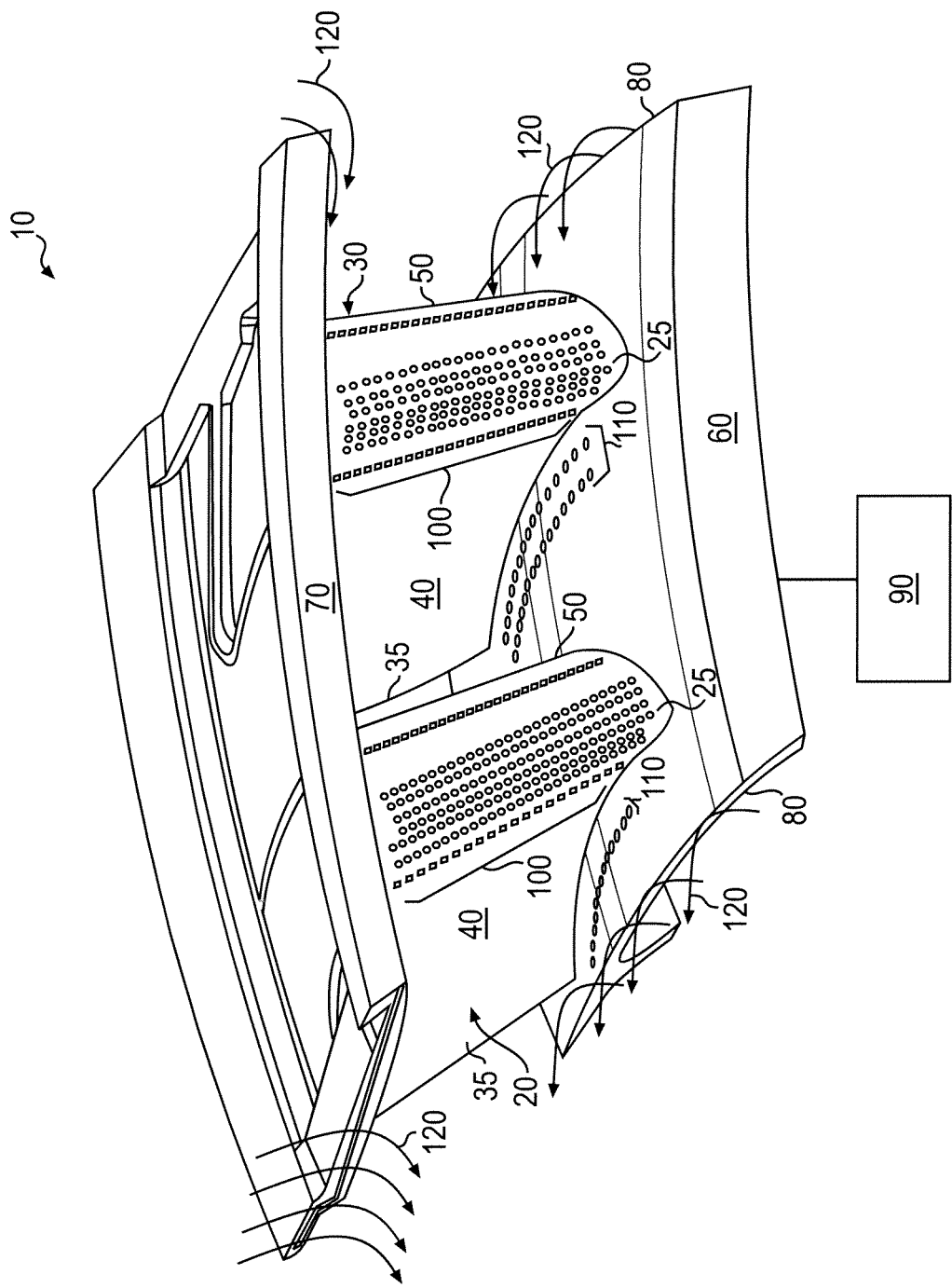
FIG. 1 is an isometric view of a turbine nozzle doublet of a GTE according to a first exemplary embodiment.

The annular ring of turbine nozzles may be circumferentially segmented, as is known in the art, into doublets 10 (i.e. pairs of two airfoils). FIG. 1 is a view of an exemplary embodiment of a turbine nozzle doublet 10 of a GTE including a first substantially hollow nozzle 20 and a second substantially hollow nozzle 30. Gas from the combustor section of the GTE (not shown), for example an axial GTE, may flow through the turbine nozzle doublets 10 to guide a flow of air from the combustor section of the GTE. As such, each of first nozzle 20 and second nozzle 30 of doublet 10 may include a leading edge 25 and a trailing edge 35 configured so as to direct gas from the leading edge 25 towards the trailing edge 35. That is, leading edge 25 is disposed in an airflow from the combustor section of the GTE (not shown) upstream of the trailing edge 35 of each of the first and second nozzles 20 and 30, respectively.

Each of the first nozzle 20 and the second nozzle 30 may be shaped in the form of an airfoil. That is, as shown in FIG. 1, each of first nozzle 20 and second nozzle 30 may include a concave surface 40 on a first side (pressure side), and an oppositely arranged convex surface 50 on a second side (suction side) thereof. That is, the concave surface 40 of each nozzle directly faces the convex surface of each adjacent nozzle. In this manner, a gas flow passage is created between adjacent nozzles, such as first nozzle 20 and second nozzle 30 of doublet 10. That is, as is known in the art, hot combustion gasses flowing over the concave surface 40, i.e. the pressure side, of second nozzle 30 encounter a higher static pressure and lower velocity than those hot combustion gasses flowing over the convex surface 50, i.e. the suction side, of first nozzle 20. As such, hot combustion gasses leaving the combustor section of the GTE (not shown) are directed between adjacent nozzles of the GTE nozzle doublet 10.

As further shown in FIG. 1, each of first nozzle 20 and second nozzle 30 of doublet 10 extend radially between an inner band 60 and an outer band 70. Each of the first nozzle 20 and second nozzle 30 of doublet 10 may be formed monolithically (e.g. cast or molded as a single unitary piece) with bands 60 and 70, or formed separately and secured to one another via any appropriate means, such as welding or brazing. Bands 60 and 70 of adjacent doublets 10 may connect to one another in order to form a ring of doublets 10, each having a first nozzle 20 and second nozzle 30. Bands 60 and 70 of adjacent doublets 10 may be connected to each other in any appropriate manner so as to form split lines, or slash faces 80 therebetween. Each of inner band 60 and outer band 70 may include any appropriate geometry, such as rails and the like, to facilitate insertion of an annular ring of doublets 10 into a turbine of a GTE.

During operation, nozzles 20 and 30 of doublet 10, which may be formed of a super-alloy such as cobalt or nickel based alloys, may be exposed to extremely high temperatures as the hot combustion gasses pass through doublet 10. As such, nozzles 20 and 30 may be at risk of premature failure, low service life, hot spots, and the like. Due to the effects of heat, turbine efficiency may be reduced. In order to reduce detrimental overheating of nozzles 20 and 30, a flow of cooling gas, such as compressed air, may be directed over the surfaces of one or more of the nozzle surfaces (e.g. the concave surface 40 or convex surface 50 of first nozzle 20 and second nozzle 30) and/or the bands 60 and 70. For example, fluid may be directed from a source 90 to a location adjacent either or both of bands 60 and 70. By way of non-limiting example, fluid may be directed from source 90 to a cavity (not shown) formed beneath (i.e. radially inward of) inner band 60 so as to pressurize said cavity. Source 90 may include any appropriate fluid, such as compressed air bled from the compressor section of the GTE (not shown).

Each of substantially hollow first nozzle 20 and second nozzle 30, as well as inner band 60, may include a plurality of cooling apertures in communication with the cavity pressurized by source 90. That is, as shown in FIG. 1, each of first nozzle 20 and second nozzle 30 may include a plurality of nozzle apertures 100, for example, on a leading edge 25 thereof. In addition, as shown in FIG. 1, band 60 may include a plurality of band apertures 110. Apertures 100 and 110 may be of any suitable shape, such as, for example, circular, oval, square, rectangular, hexagonal, etc. Further, each of apertures 100 and 110 may be formed through any appropriate means such as EDM (electron discharge machining), laser punching or the like. In addition, each of apertures 100 and 110 may in fluid communication with the cavity pressurized by source 90. That is, fluid from source 90 may be directed though apertures 100 and 110 to cool surfaces of nozzles 20 and 30.

Cooling fluid supplied from source 90 through apertures 100 and 110, through an interior of nozzles 20 and 30, and against interior surfaces of bands 60 and 70 may be considered first order cooling. That is, intentional cooling. In addition to such intentional first order cooling, a number of sources may contribute to second order, or unintentional cooling of one or more surfaces of nozzles 20 and 30 of each doublet 10. This second order cooling may be referred to as "phantom cooling" and may reduce the amount of first order cooling required.

Phantom cooling affects may be attributed to a number of sources, for example, re-circulating first order cooling flows and leakage from the cavity pressurized by source 90 through split lines or slash faces 80 between adjacent doublets 10. For example, as shown in FIG. 1, phantom cooling flows 120 may be found leaking through split lines or slash faces 80. Due to the arrangement of doublets 10 in the turbine of the GTE (not shown), the phantom cooling flow 120 is directed towards the convex surface 50 of the second nozzle 30 of each doublet 10. As such, the convex surface 50 of second nozzle 30 and the concave surface 40 of the first nozzle 20 (those closer to split lines or slash faces 80) may be subjected to a greater amount of second order phantom cooling than the concave surface 40 of the second nozzle 30 and the convex surface 50 of the first nozzle 20. As such, less first order cooling may be necessary in these areas.

In order to take advantage of this phantom cooling flow 120, doublet 10 may be constructed in an asymmetric fashion so as to account for varying degrees of second order cooling experienced at different locations within doublet 10. An asymmetric fashion/arrangement may include a varying number, placement, or size of apertures on first and second nozzles 20 and 30, and/or bands 60 and 70 across the doublet 10 as will be explained in further detail below. For example, as shown in the exemplary embodiment of FIG. 1, inner band 60 may include more band apertures 110 between concave surface 40 of second nozzle 30 and convex surface 50 of first nozzle 20 (those areas exposed to less phantom cooling flow 120) than between concave surface 40 of first nozzle 20 and the convex surface 50 of the second nozzle 30 of an adjacent doublet 10. By way of non-limiting example, two rows of band apertures 110 may be provided between first and second nozzles 20 and 30 of doublet 10 while only a single row of band apertures 110 may be provided between the concave surface 40 of first nozzle 20 and the convex surface 50 of the second nozzle 30 of an adjacent doublet 10. As such, more first order cooling may be provided to the those areas of doublet exposed to less phantom cooling flow 120.

It is to be noted, that while a ratio of 2:1 rows of band apertures 110 has been illustrated, any other asymmetric ratio may be provided according to additional exemplary embodiments. In addition, rather than providing a varying number of band apertures 110, the size of band apertures 110 may be asymmetric according to an additional exemplary embodiment. For example, rather than the inclusion of a greater amount of band apertures 110 between the first nozzle 20 and the second nozzle 30 of doublet 10, the band apertures 110 located between the first nozzle 20 and the second nozzle 30 of doublet 10 may be larger than those positioned between the concave surface 40 of first nozzle 20 and the convex surface 50 of the second nozzle 30 of the adjacent doublet 10. That is, any appropriate arrangement of band apertures 110 may be provided so as to impart a decreased degree of first order cooling along those portions of the doublet exposed to greater amounts of phantom cooling flow 120.

Figure 2A:
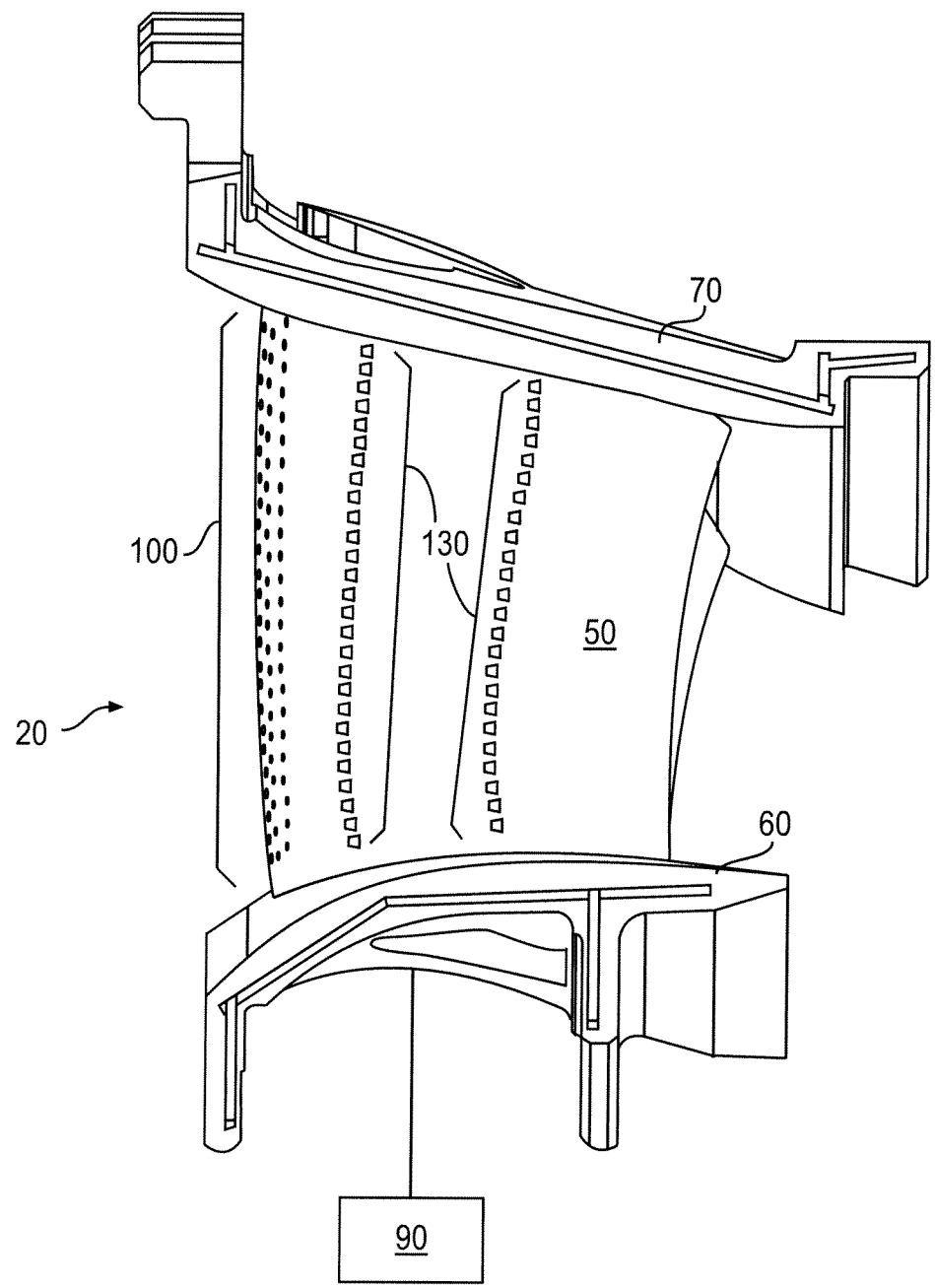
FIG. 2A is a first sectional view of a turbine nozzle doublet of a GTE according to a second exemplary embodiment.
Figure 2B:
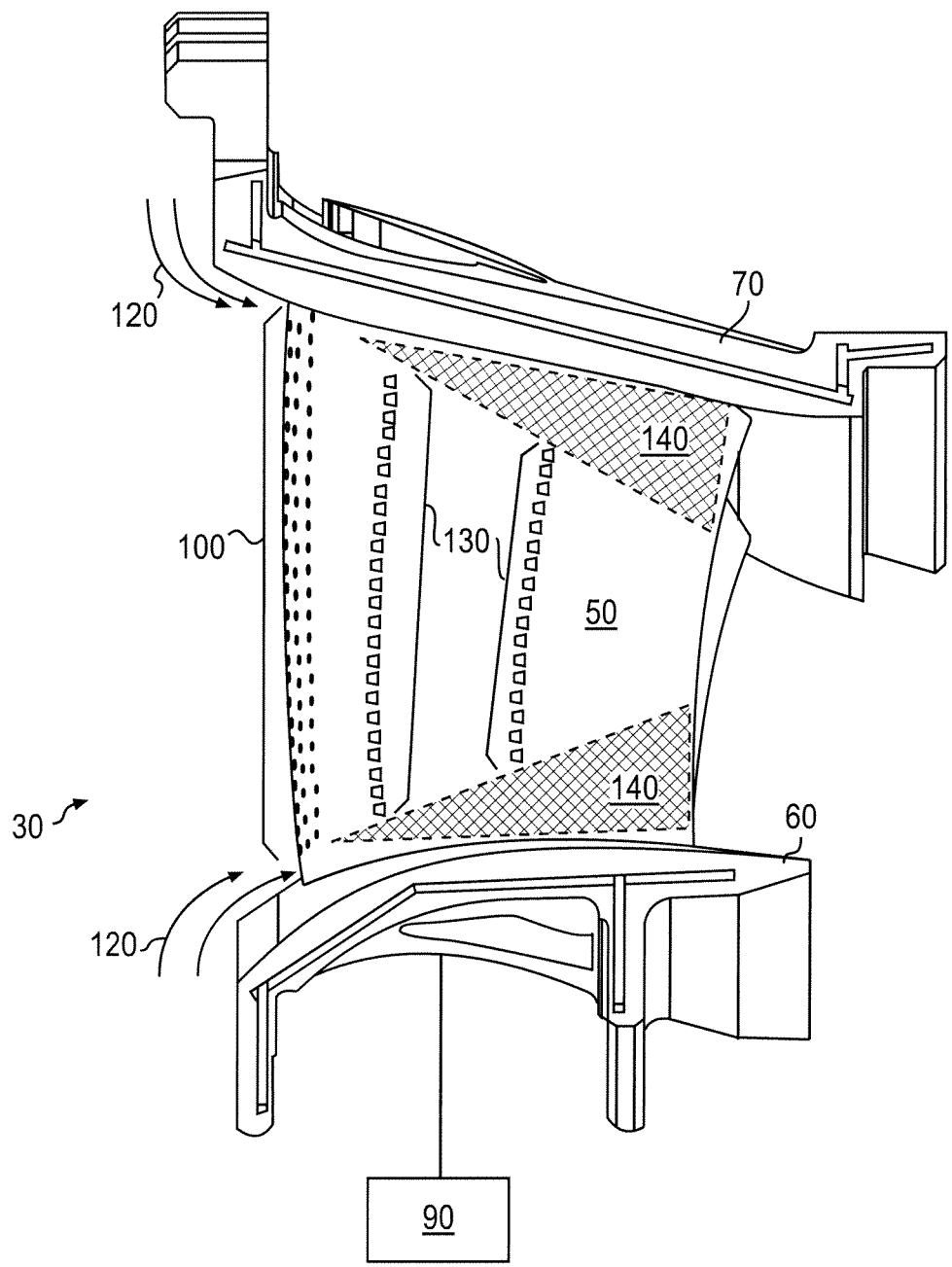
FIG. 2B is a second sectional view of a turbine nozzle doublet of a GTE according to the second exemplary embodiment.

According to an additional exemplary embodiment, as shown in FIGS. 2A and 2B, an asymmetric arrangement of nozzle apertures 100 may be employed in order to take advantage of the phantom cooling flow 120. For example, as shown in FIG. 2A, the convex surface 50 of first nozzle 20 may include two additional rows of nozzle apertures 100, such as convex surface nozzle apertures 130. Apertures 130 may be configured similarly apertures 100 discussed above, and are configured to deliver first order cooling between first and second nozzles 20 and 30 of doublet 10. As shown in FIG. 2A, convex surface nozzle apertures 130 may extend in rows across convex surface 50 of first nozzle 20 and radially between inner band 60 and outer band 70.

In contrast, as shown in FIG. 2B, a reduced amount of convex surface nozzle apertures 130 may be provided on the convex surface 50 of the second nozzle 30. That is, due to the increased amount of phantom cooling flow 120 impacting convex surface 50 of second nozzle 30, the number of convex surface nozzle apertures 130 may be reduced. For example, as shown in FIG. 2B, convex surface 50 of second nozzle 30, being closer to split line or slash face 80, is exposed to a greater degree of phantom cooling flow 120, especially within zones 140 along bands 60 and 70. In order to take advantage of such second order cooling, convex surface 50 is formed without convex surface nozzle apertures 130 within zone 140.

Figure 3:
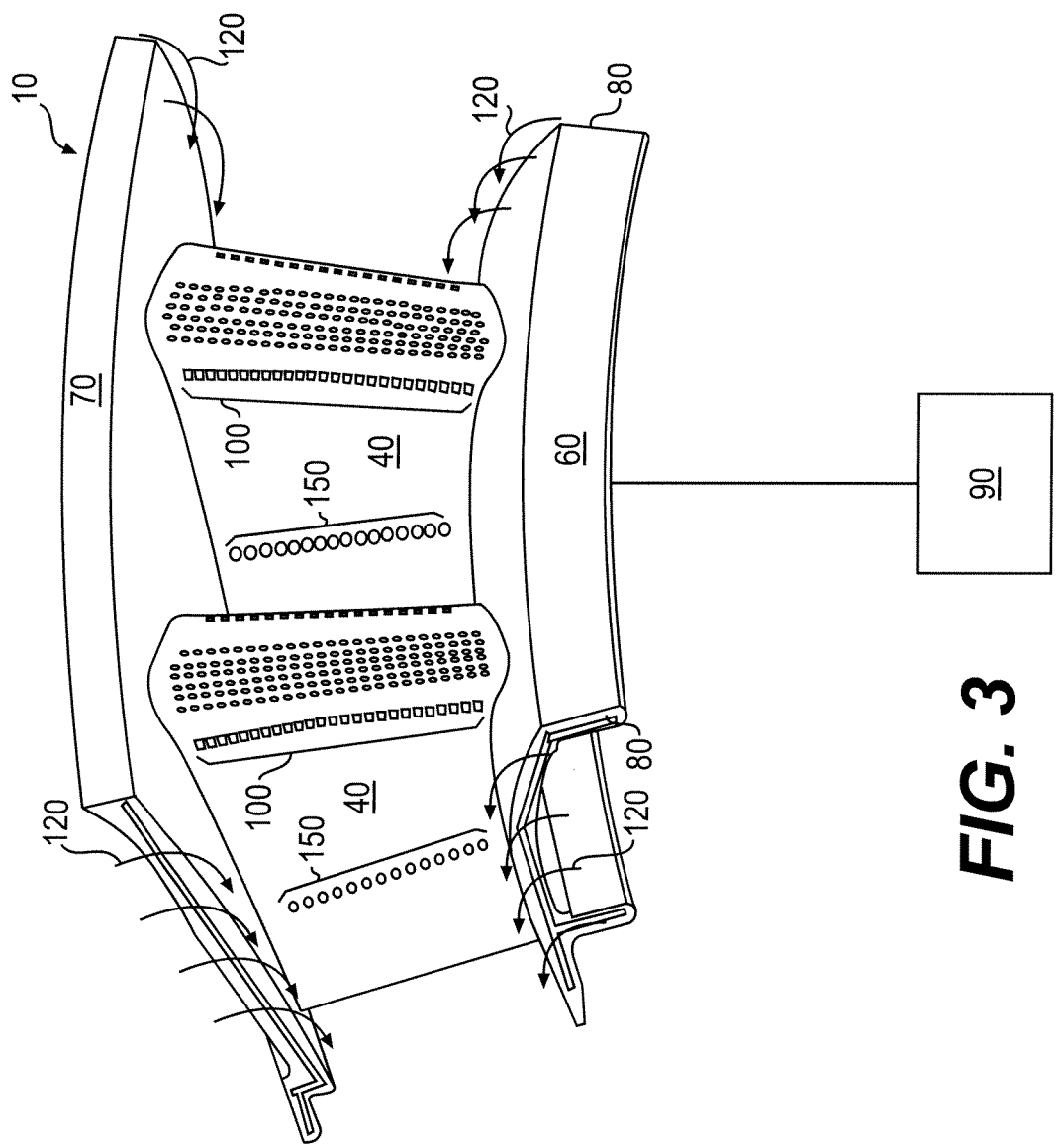
FIG. 3 is an isometric view of a turbine nozzle doublet of a GTE according to a third exemplary embodiment.

According to an additional exemplary embodiment, as shown in FIG. 3, an asymmetric arrangement of nozzle apertures 100 may be employed in order to take advantage of the phantom cooling flow 120. For example, the concave surface 40 of each of the first nozzle 20 and the second nozzle 30 may include one or more rows of nozzle apertures 100, such as concave surface nozzle apertures 150. Apertures 150 may be configured similarly to apertures 100 discussed above, and are configured to deliver first order cooling between adjacent nozzles 20 and 30 of doublet 10. As shown in FIG. 3, concave surface nozzle apertures 150 may extend in rows across concave surface 40 of each of the first nozzle 20 and the second nozzle, and radially between inner band 60 and outer band 70.

As shown in FIG. 3, a size or diameter of concave surface nozzle apertures 150 on the concave surface 40 of first nozzle 20 may be smaller than the size or diameter of the concave surface nozzle apertures 150 on the concave surface 40 of the second nozzle 30. As such, more first order cooling may be provided to the those areas of doublet 10 exposed to less phantom cooling flow 120. It is to be noted, rather than the size of concave surface nozzle apertures 150 being asymmetric, according to an additional exemplary embodiment apertures 150 may be the same size on each of first and second nozzles 20 and 30, respectively, while a greater number may be disposed on the concave surface 40 of second nozzle 30. That is, any appropriate arrangement of apertures 150 may be provided so as to impart a decreased degree of first order cooling along those portions of the doublet 10 exposed to greater amounts of phantom cooling flow 120.

Moreover, it is to be noted that each of the exemplary embodiments as shown in FIGS. 1-3 may be utilized concurrently. That is, the asymmetric arrangements or sizes of apertures 110, 130, and 150, may be utilized on the same doublet 10 to effect a balanced cooling of doublet 10 by taking advantage of phantom cooling flow 120.

INDUSTRIAL APPLICABILITY

The disclosed turbine nozzle may be applicable to any GTE in which components of the GTE are exposed to extremely high heat. Additionally, the disclosed turbine nozzle may be applicable to any GTE in which both first and second order cooling is present. Further, although the exemplary embodiments have been described with respect to turbine nozzles in the first stage turbine assembly, the system may be applied to any turbine nozzle in any stage of the turbine section of a GTE. Also, the described turbine nozzle may be applied in a variety of industries, for example, turbine manufacturing, heat exchange, energy, or aerospace.

The following operation will be directed to a turbine nozzle of a GTE; however, airflow though other airfoils or tubular apparatuses could be similar.

Figure 4:
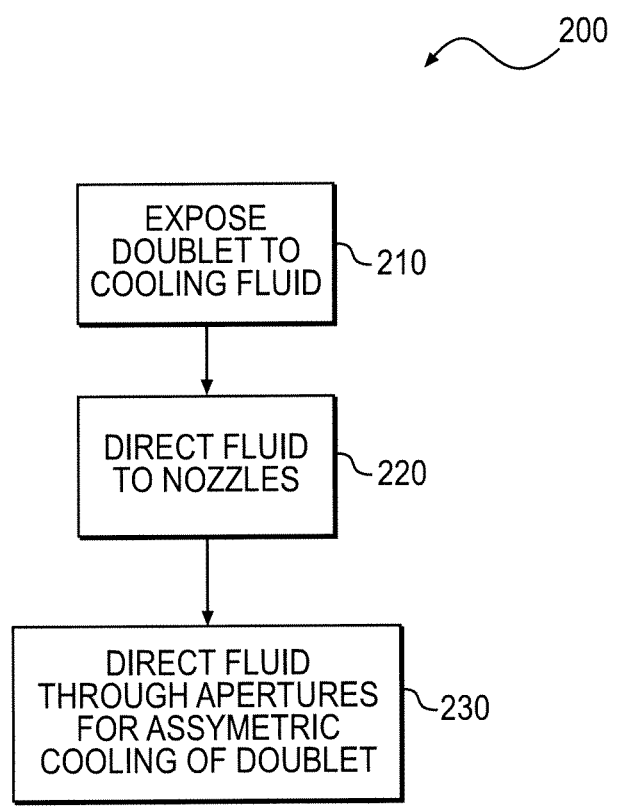
FIG. 4 is a flow diagram illustrating a method of cooling a turbine nozzle doublet of a GTE.

As shown in FIG. 4, a method 200 of cooling a turbine nozzle doublet 10 is illustrated. The method 200 may include exposing a turbine nozzle doublet 10 to a source 90 of cooling fluid at step 210. The method 200 may further include directing fluid from the source 90 to each of a hollow first nozzle 20 and a hollow second nozzle 30 at step 220. At step 230, the method may further include directing the fluid though a plurality of apertures 100, 110, 130, and/or 150 arranged on one or more surfaces of nozzles 20 and 30, inner band 60, or outer band 70 so that the cooling provided by the apertures 110, 110, 130, and/or 150 is asymmetric about the doublet 10, the asymmetry being a function of cooling that results from sources other than the apertures 100, 110, 130, and/or 150 (e.g. phantom cooling).

The presently disclosed turbine nozzle doublet 10 of a GTE may have numerous features. By arranging cooling apertures 110, 130, and 150 so as to take advantage of leakage along split lines or slash faces 80 of doublet 10, second order phantom cooling flow 120 may be utilized. Such utilization may reduce first order cooling requirements in those areas most affected by phantom cooling flow 120 (e.g. the convex surface 50 of second nozzle 30 and the concave surface 40 of the first nozzle 20). As such, an amount of cooling flow (the cooling mass flow) required may be reduced, thereby increasing overall turbine efficiency. In addition, by avoiding overlapping of first and second order cooling flows, an increasingly uniform surface temperature of various components of doublet 10 may be achieved. Such uniform temperature may aid in increasing service life of doublet 10 by avoiding excessive hot spots.

It will be apparent to those skilled in the art that various modifications and variations can be made to the disclosed turbine nozzle and method of cooling it within GTE. Other embodiments will be apparent to those skilled in the art from consideration of the specification and practice of the disclosed embodiments. It is intended that the specification and examples be considered as exemplary only, with a true scope being indicated by the following claims and their equivalents.

What is claimed is:

1. A nozzle arrangement for a gas turbine engine, comprising:
    a first housing member and a second housing member;
    a first nozzle and a second nozzle, each of the first nozzle and second nozzle extending between the first housing member and the second housing member so as to form a doublet, wherein each of the first nozzle and the second nozzle are airfoil shaped and include a concave surface and an oppositely arranged convex surface;
    wherein the convex surface of the first nozzle faces the concave surface of the second nozzle;
    wherein a plurality of cooling apertures are arranged on at least one of the first nozzle, the second nozzle, the first housing member, or the second housing member so as to provide a different degree of first order cooling across the doublet;
    wherein the plurality of cooling apertures includes a larger number of apertures on the convex surface of the first nozzle than the convex surface of the second nozzle; and
    wherein the convex surface of the second nozzle includes an upper triangular zone adjacent to the first housing member and a lower triangular zone adjacent to the second housing member, wherein the upper and lower triangular zones are devoid of the plurality of cooling apertures, and at least a portion of the convex surface of the second nozzle outside of the upper and lower triangular zones includes a plurality of cooling apertures.

2. The nozzle arrangement of claim 1, wherein the plurality of apertures includes a larger number of apertures on at least one of the first housing member or the second housing member between the concave surface of the second nozzle and the convex surface of the first nozzle than between a concave surface of the first nozzle and an adjacent end of the doublet.

3. The nozzle arrangement of claim 1, wherein the plurality of apertures includes a first group of apertures on the concave surface of the first nozzle and a second group of apertures on the concave surface of the second nozzle, wherein a size of the first group of apertures is smaller than a size of the second group of apertures.

4. The nozzle arrangement of claim 1, wherein at least one of the first housing member or the second housing member are pressurized with a source of compressed fluid.

5. The nozzle arrangement of claim 4, wherein each of the first nozzle and the second nozzle are substantially hollow and configured to expel compressed fluid from the at least one of the first housing member or the second housing member through the plurality of cooling apertures.

6. A nozzle arrangement for a gas turbine engine, comprising:
    a first housing member and a second housing member;
    a first nozzle and a second nozzle, each of the first nozzle and second nozzle extending between the first housing member and the second housing member so as to form a doublet, wherein each of the first nozzle and the second nozzle are airfoil shaped and include a concave surface and an oppositely arranged convex surface;
    wherein the convex surface of the first nozzle faces the concave surface of the second nozzle;
    wherein a plurality of cooling apertures are arranged on at least one of the first nozzle, the second nozzle, the first housing member or the second housing member, the arrangement of apertures being asymmetric with respect to the first and second nozzles; and
    wherein the convex surface of the second nozzle includes an upper triangular zone adjacent to the first housing member and a lower triangular zone adjacent to the second housing member, wherein the upper and lower triangular zones are devoid of the plurality of cooling apertures, and at least a portion of the convex surface of the second nozzle outside of the upper and lower triangular zones includes a plurality of cooling apertures.

7. The nozzle arrangement of claim 6, wherein the plurality of apertures includes a larger number of apertures on at least one of the first housing member or the second housing member between the concave surface of the second nozzle and the convex surface of the first nozzle than between a concave surface of the first nozzle and an adjacent end of the doublet.

8. The nozzle arrangement of claim 6, wherein the plurality of apertures includes a larger number of apertures on the convex surface of the first nozzle than the convex surface of the second nozzle.

9. The nozzle arrangement of claim 6, wherein the plurality of apertures includes a first group of apertures on the concave surface of the first nozzle and a second group of apertures on the concave surface of the second nozzle, wherein a size of the first group of apertures is smaller than a size of the second group of apertures.

10. A nozzle arrangement for a gas turbine engine, comprising:
    a first housing member and a second housing member;
    a first nozzle and a second nozzle, each of the first nozzle and second nozzle extending between the first housing member and the second housing member so as to form a doublet, wherein each of the first nozzle and second nozzle include a concave surface and an oppositely arranged convex surface; and
    a plurality of cooling apertures are arranged on at least one of the first nozzle, the second nozzle, the first housing member or the second housing member;
    wherein the plurality of apertures includes a larger number of apertures on at least one of the first housing member or the second housing member between the concave surface of the second nozzle and the convex surface of the first nozzle than between a concave surface of the first nozzle and an adjacent end of the doublet; and
    wherein the convex surface of the second nozzle includes an upper triangular zone adjacent to the first housing member and a lower triangular zone adjacent to the second housing member, wherein the upper and lower triangular zones are devoid of the plurality of cooling apertures, and at least a portion of the convex surface of the second nozzle outside of the upper and lower triangular zones includes a plurality of the cooling apertures.

11. The nozzle arrangement of claim 10, wherein the plurality of apertures includes a larger number of apertures on the convex surface of the first nozzle than the convex surface of the second nozzle.

12. The nozzle arrangement of claim 10, wherein the plurality of apertures includes a first group of apertures on the concave surface of the first nozzle and a second group of apertures on the concave surface of the second nozzle, wherein a size of the first group of apertures is smaller than a size of the second group of apertures.

13. The nozzle arrangement of claim 10, wherein at least one of the first housing member or the second housing member are pressurized with a source of compressed fluid, and wherein each of the first nozzle and the second nozzle are substantially hollow and configured to expel compressed fluid from the at least one of the first housing member or the second housing member through the plurality of apertures.

* * * * *